(12) United States Patent
Chatterjee et al.

(10) Patent No.: US 12,001,441 B2
(45) Date of Patent: Jun. 4, 2024

(54) SYSTEMS AND METHODS FOR GENERATING GRAPHICAL RELATIONSHIP MAPS

(71) Applicant: American Express Travel Related Services Company, Inc., New York, NY (US)

(72) Inventors: Arindam Chatterjee, Scottsdale, AZ (US); Pratap Singh Rathore, Phoenix, AZ (US); Nitish Sharma, Scottsdale, AZ (US); Swatee Singh, Scottsdale, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

(21) Appl. No.: 16/560,619

(22) Filed: Sep. 4, 2019

(65) Prior Publication Data

US 2021/0064608 A1    Mar. 4, 2021

(51) Int. Cl.
 *G06F 16/248* (2019.01)
 *G06F 16/245* (2019.01)
 *G06F 16/26* (2019.01)
 *G06F 40/40* (2020.01)

(52) U.S. Cl.
 CPC .......... *G06F 16/248* (2019.01); *G06F 16/245* (2019.01); *G06F 16/26* (2019.01); *G06F 40/40* (2020.01)

(58) Field of Classification Search
 None
 See application file for complete search history.

(56) References Cited

U.S. PATENT DOCUMENTS

| | | | |
|---|---|---|---|
| 8,145,679 B1 | 3/2012 | Baluja et al. | |
| 8,386,377 B1 | 2/2013 | Xiong | |
| 9,721,039 B2 | 8/2017 | Bier | |
| 9,773,247 B1 | 9/2017 | Keld | |
| 2005/0120332 A1* | 6/2005 | Martin | G06Q 10/10 717/105 |
| 2008/0270458 A1* | 10/2008 | Gvelesiani | G06F 16/288 |
| 2008/0301120 A1* | 12/2008 | Zhu | G06Q 40/00 |
| 2009/0248434 A1 | 10/2009 | Pfeffer et al. | |
| 2010/0250497 A1* | 9/2010 | Redlich | H04L 63/105 707/661 |
| 2011/0142217 A1 | 6/2011 | Goldfarb | |
| 2011/0252032 A1 | 10/2011 | Fitzgerald et al. | |
| 2011/0270853 A1 | 11/2011 | Curbera | |
| 2012/0072475 A1 | 3/2012 | Morrison | |
| 2012/0130724 A1 | 5/2012 | Flegel et al. | |
| 2012/0324027 A1 | 12/2012 | Vaynblat et al. | |

(Continued)

OTHER PUBLICATIONS

Non-Final Office Action dated Feb. 27, 2014 in U.S. Appl. No. 13/675,651.

(Continued)

*Primary Examiner* — Dawaune A Conyers (57) ABSTRACT

A system for generating graphical relationship maps is disclosed. The system may receive a search request. The system may generate a relationship map data based on linked data elements of at least one of a structured data set, an unstructured data set, and a hybrid data set comprising structured and unstructured data. The system may display a graphical relationship map including an entity type icon based on the relationship map data and the search request.

20 Claims, 5 Drawing Sheets

(56) References Cited

U.S. PATENT DOCUMENTS

| | | | |
|---|---|---|---|
| 2013/0124357 A1 | 5/2013 | He et al. | |
| 2013/0275429 A1* | 10/2013 | York | G06F 16/435 |
| | | | 707/E17.002 |
| 2013/0332478 A1* | 12/2013 | Bornea | G06F 16/901 |
| | | | 707/763 |
| 2014/0122595 A1 | 5/2014 | Murdoch et al. | |
| 2016/0034600 A1* | 2/2016 | Joshi | G06F 16/90335 |
| | | | 707/769 |
| 2017/0337262 A1* | 11/2017 | Smith | G06T 11/206 |
| 2018/0336221 A1* | 11/2018 | Peña Muñoz | G06F 7/535 |
| 2019/0065459 A1* | 2/2019 | Andrews | G06F 40/289 |
| 2020/0320111 A1* | 10/2020 | Roberts | G06F 16/951 |

OTHER PUBLICATIONS

Final Office Action dated Jun. 13, 2014 in U.S. Appl. No. 13/675,651.
Advisory Action dated Jul. 31, 2014 in U.S. Appl. No. 13/675,651.
Non-Final Office Action dated Sep. 2, 2014 in U.S. Appl. No. 13/675,651.
Final Office Action dated Jan. 29, 2015 n U.S. Appl. No. 13/675,651.
Advisory Action dated Mar. 4, 2015 in U.S. Appl. No. 13/675,651.
Non-Final Office Action dated Aug. 25, 2016 in U.S. Appl. No. 14/750,017.
Non-Final Office Action dated May 11, 2018 in U.S. Appl. No. 15/494,792.
Final Office Action dated Oct. 12, 2018 in U.S. Appl. No. 15/494,792.
Advisory Action dated Jan. 2, 2019 in U.S. Appl. No. 15/494,792.
Non-Final Office Action dated Feb. 20, 2019 in U.S. Appl. No. 15/494,792.
Final Office Action dated Aug. 16, 2019 in U.S. Appl. No. 15/494,792.

* cited by examiner

SYSTEMS AND METHODS FOR GENERATING GRAPHICAL RELATIONSHIP MAPS

FIELD

The present disclosure generally relates to systems and methods for generating graphical relationship maps.

BACKGROUND

A company may store information across a plurality of information systems. Each of the information systems tend to employ a variety of formatting, interfaces, security systems, and transfer protocols. Furthermore, each of the information systems may include various information sets related to a plurality of entities such as, for example, platforms, technologies, employees, and/or the like. In this regard, determining relationships between the various entities across the information systems may be time consuming, may demand a relatively large number of user inputs, and may be intolerant of informational faults. Furthermore, searching for entities that related to a particular entity tends to be inhibited in proportion to the number of differing information systems.

SUMMARY

In various embodiments, a system, method, and/or article of manufacture (collectively, the "system") for generating a graphical relationship map is disclosed. The system may receive a search request. The system may generate a relationship map data based on linked data elements of at least one of a structured data set, an unstructured data set, and a hybrid data set comprising structured and unstructured data. The system may display a graphical relationship map including an entity type icon based on the relationship map data and the search request.

In various embodiments, the system may link a first structured data set defining a first entity type with a second structured data set defining a second entity type to generate a structured link set, wherein the structured link set is based on a common key. The system may join the structured link set to the relationship map data. In various embodiments, the system may link a first unstructured data set defining a third entity type with at least one of the first structed data set or the second structured data set to generate a hybrid link set, wherein the hybrid link set is based on an inference between the first structured data set and the first unstructured data set. The system may join the hybrid link set to the relationship map data. In various embodiments, the system may link a second unstructured data set defining a fourth entity type with the first unstructured data set to generate an unstructured link set, wherein the unstructured link set is based on a user entity. The system may join the unstructured link set to the relationship map data.

In various embodiments, the system may apply a natural language processing algorithm to at least one of first unstructured data set or the second unstructured data set to generate the unstructured link set. In various embodiments, they system may apply a natural language processing algorithm to the first unstructured data set and the second unstructured data set to generate a corresponding topic set, wherein the corresponding topic set comprises matched topics between the first unstructured data set and the second unstructured data set. The system may generate the unstructured link set based on the corresponding topic set. In various embodiments, the graphical relationship map includes a plurality of entity type icons each associated on a one to one basis with the first entity type, the second entity type, the third entity type, and the fourth entity type, wherein the graphical relationship map includes a plurality of links between the plurality of entity type icons based on at least one of the structured link set, the hybrid link set, or the unstructured link set.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The system provides a greater level of sophistication and control for information visualization. Benefits of the present disclosure may apply to any suitable use of data or information visualization. For example, the present disclosure may apply in business information contexts, data requests and/or support contexts.

While prior art systems typically include the technical problem of demanding multiple user inputs to extract information through a variety of formatting, interface, security, and display protocols as between information systems, the current system provides a technical solution by enabling a common visualization and search function across a plurality of environments. In this regard, the system may increase the speed and efficiency of data processing and data visualization. The system may reduce the time a data mining process is engaged by a user or system. The system may also reduce redundant extraction requests by decreasing association and/or linking errors, and thereby reducing a demand for system resources. The system may also simplify data sorting, routing, and processing, while enhancing a user experience by decreasing a number of user interactions.

This process improves the functioning of the computer. For example, the process increases the reliability and speed of data visualization by reducing a number of user inputs and/or bypassing a number of user input requests and enabling discrete reporting of linked entity types. Similarly, the process increases the reliability and speed of data presentation by enabling automated association and visualization. In various embodiments, the processes described herein may increase network availability by reducing front end and back end process calls, network hops and/or duplicate linking operations. The processes may also save processing resources including CPU time, memory resources, and network resources. For example, the system may deploy graphical databases with native graph storage tending thereby to optimize graphic processes by generating nodes of proximate data. In this regard, the system may tend to reduce data storage overhead and improve data access and processing times.

Figure 1:
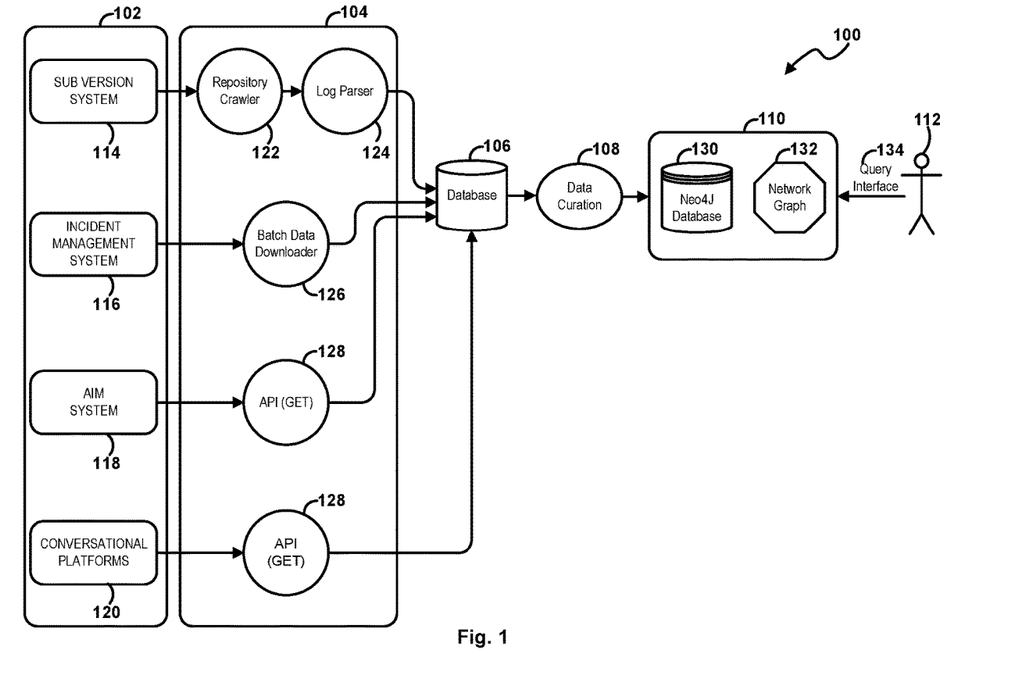
FIG. 1 is a block diagram illustrating various system components of a system for generating graphical relationship maps, in accordance with various embodiments.

In various embodiments, and with reference to FIG. 1, a system 100 for generating graphical relationship maps may comprise any number of information systems 102, data extraction engines 104, a prework database 106, a mapping engine 108, a graphing engine 110, and a user device 112. Any of these components may be outsourced and/or be in communication with system 100 via a network. System 100 may be computer based, and may comprise a processor, a tangible non-transitory computer-readable memory, and/or a network interface, along with other suitable system software and hardware components. Instructions stored on the tangible non-transitory memory may allow system 100 to perform various functions, as described herein. In various embodiments, system 100 may be configured as a central network element or hub to access various systems, engines, and components of system 100. System 100 may comprise a network, computer-based system, and/or software components configured to provide an access point to various systems, engines, and components of system 100 from the user device 112. Graphing engine 110 may be in operative and/or electronic communication with a user via the user device 112. Further information about graphing engines and entity graphs may be found in U.S. Pat. No. 9,087,088 issued Jul. 21, 2015 entitled "SYSTEMS AND METHODS FOR DYNAMIC CONSTRUCTION OF ENTITY GRAPHS" (aka U.S. Ser. No. 13/675,651 filed Nov. 13, 2012); U.S. Ser. No. 15/941,892 filed Mar. 30, 2018 entitled "NODE LINKAGE IN ENTITY GRAPHS"; and U.S. Ser. No. 15/991,210 filed May 29, 2018 entitled "NETWORK NODE CONSOLIDATION," all of which are hereby incorporated by reference in their entirety for all purposes.

In various embodiments, the information systems 102 may include any number of information systems. Information systems 102 may include software configuration management systems such as, for example, a sub version system 114 and an application information management system 118. Information systems 102 may include business information systems such as an incident management system 116. Information systems 102 may include conversational platforms 120 such as, for example, slack, internet relay chat, web pages, message boards, and/or the like.

In various embodiments, data extraction engines 104 may be in communication with the prework database 106 and the information systems 102. The data extraction engines 104 may extract data sets from information systems 102 such as, for example, an unstructured data set, a structured data set, and a hybrid data set comprising structured an unstructured data. In various embodiments, the data extraction engines include a crawler 122, a log parser 124, a batch downloader 126, and various Application Programming Interfaces (APIs) 128. In this regard, the data extraction engines 104 may populate the prework database 106 in response to a search request from the user device 112.

The prework database 106 may include any number of data structures or data elements populated by data extraction engines 104 such as one or more structured or unstructured data sets. Each data set may define an entity type. For example, a user entity may be defined by one or more data sets comprising elements such as, for example, user IDs, usernames, passwords, email addresses, proper names, job type, organizational chart data, and/or the like. In various embodiments, a platform entity may be defined by a server data set including, for example, a table of platforms, a set of active applications hosted by each of the platforms, a technology type, a database type, a user set, and/or the like. In various embodiments, an application entity may be defined by a set of application data set including, for example, an application ID, a user ID, a host server, a related technology set, a programming language, and/or the like. In this regard, the system may define any number of entity types.

In various embodiments, the mapping engine 108 may generate relationship map data 130 comprising link sets between the plurality of entity types defined in prework database 106. For example, the mapping engine 108 may link a first structured data set and a second structured data set to generate a structured link set. The structured link between the structured data sets may be based on a common key between each of the first structured data set and the second structured data set such as, for example, the application ID, the user ID, an employee ID, a key field and/or the like. The mapping engine 108 may generate a hybrid link set between an unstructured data set and a structured data set based on an inference between structured data set and the unstructured data set to generate a hybrid link set. In various embodiments, the system may tag elements to be linked during onboarding based on their data source and whether it is structured or unstructured.

For example, the mapping engine 108 may apply a natural language processing algorithm to an unstructured data set to generate a topic set, a keyword set, and/or the like for each of the unstructured data sets. The mapping engine 108 may compare the topic sets to generate a corresponding topic set comprising matched topics between the unstructured data sets (e.g., between a first unstructured data set and a second unstructured data set). In this regard, mapping engine 108 may generate an unstructured linked set based on the corresponding topic set. In various embodiments, the unstructured link set may be associated with the user entity by the mapping engine 108. In this regard, unstructured link sets and structured link sets may be joined via the user entity to generate the hybrid link set. Stated another way, an unstructured data set may be linked with a structured data set based on association with the user entity.

In various embodiments, the relationship map data 130 includes a plurality of joined link sets. The links sets may include structured link sets, unstructured link sets, and hybrid link sets. The structured link sets may be joined between entity types defined by structured data sets. The unstructured link sets may be joined between entity types defined by unstructured data sets. The hybrid link sets may be joined between structured and unstructured data sets.

In various embodiments, the graphing engine 110 may generate a graphical relationship map 132 based on the relationship map data 130. The graphical relationship map 132 includes a plurality of entity type icons each associated on a one to one basis with an entity type defined by data sets of the prework database 106. For example, the graphical relationship map 132 may display a user entity icon, a platform entity icon, a technology entity icon, an application entity icon, and/or the like. The graphical relationship map 132 may include a plurality of links between the entity type icons. The links may be based on the link sets generated between each of the entity types by the mapping engine 108. In various embodiments, the graphing engine 110 may receive a search request from the user device 112 at a query interface 134. The query interface 134 may comprise a plain text search field. The graphing engine 110 may generate the graphical relationship map 132 based on the search request.

In various embodiments, a user device 112 may comprise software and/or hardware in communication with the system 100 via a network comprising hardware and/or software configured to allow a user, and/or the like, access to the graphing engine 110 and query interface 134. The user device may comprise any suitable device that is configured to allow a user to communicate with a network and the system 100 via the query interface 134. The user device may include, for example, a personal computer, personal digital assistant, cellular phone, kiosk, and/or the like and may allow a user to transmit search requests to the system 100.

Figure 2:
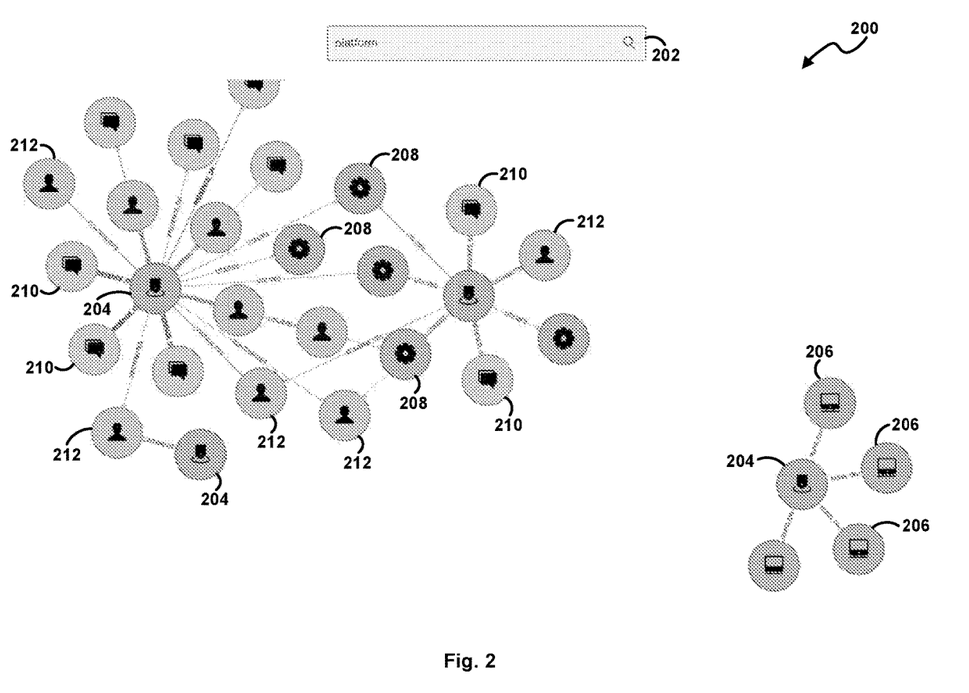
FIG. 2 illustrates a graphical relationship map associated with a first search request, in accordance with various embodiments.

In various embodiments, and with additional reference to FIG. 2, a graphical relationship map 200 is illustrated. Graphical relationship map 200 (i.e., map 200) is associated with a first search request. An entity type and a relationship may be entered into the search field 202 of the query interface 134. For example, map 200 may be displayed in response to entering a "platform" entity type and/or a "runs on" relationship. In this regard, a search request may be of the form, "platforms which run application X", "platforms using technology Y", "users associated with platform Z", and/or the like. Map 200 includes a plurality of platform entity icons 204 associated with various platform entities defined in the prework database 106. The platform entity icons 204 form central nodes with branching links between related entity types illustrated by corresponding entity type icons. The links between the entity type icons are defined by the various link sets of relationship map data 130. Each of the links may include link set information defining the relationship between the entity types. In this regard the map 200 enables visualization of the relationships between the various entity types defined in the prework database 106 based on the relationship map data 130.

For example, one or more application entities may be associated with the platform entities. The map 200 may include application entity icons 206 linked with platform entity icons 204 by a link set defining a "runs on" link. In like regard, the map 200 may include technology entity icons 208 associated with the platform entity icons 204 by a "uses" link. The platform entity icons 204 may be associated with one or more communications channel icons 210 by a "presence" link. In this regard, a platform entity may be associated with a communications channel entity where users may be generating content related to the platform entity. The map 200 may include user entity icons 212 associated with the platform entity icons 204 via "contributes" links. In this regard, the map 200 enables visualization of a platform entity user base by displaying the plurality of user entities associated with the platform entity.

Figure 3:
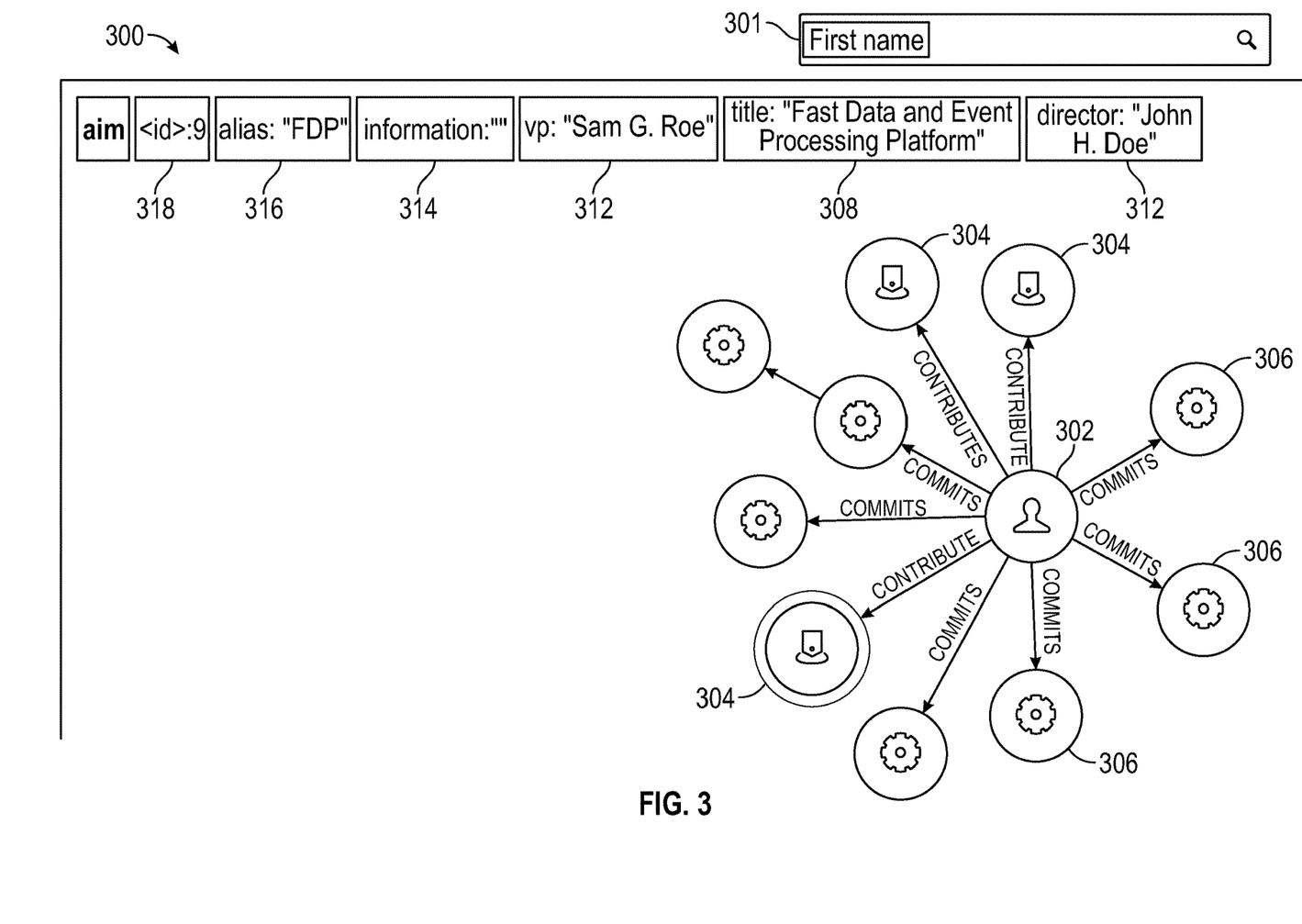
FIG. 3 illustrates a graphical relationship map associated with a second search request, in accordance with various embodiments.

In various embodiments and with additional reference to FIG. 3, a graphical relationship map 300 is illustrated. Graphical relationship map 300 (i.e., map 300) is associated with a second search request 301. The second search request 301 may include a user entity of the form, "Firstname Lastname", a user ID, an email address and or the like. The map 300 displays the set of entity types associated with the user entity. For example, the map 300 includes the user entity icon 302 as a central node with branching links between related entity types illustrated by corresponding entity type icons. The user entity icon 302 may be related to various platform entity icons, such as technology entity icons 306 and platform entity icons 304. In various embodiments, any of the entity type icons may be selected and the map 300 may display related information. For example, a platform entity icon 304 may be selected, and in response, the map 300 may display a related platform title 308, a director name 310, a manager name 312, a related information field 314, a title alias 316, and an entity ID 318.

Figure 4:
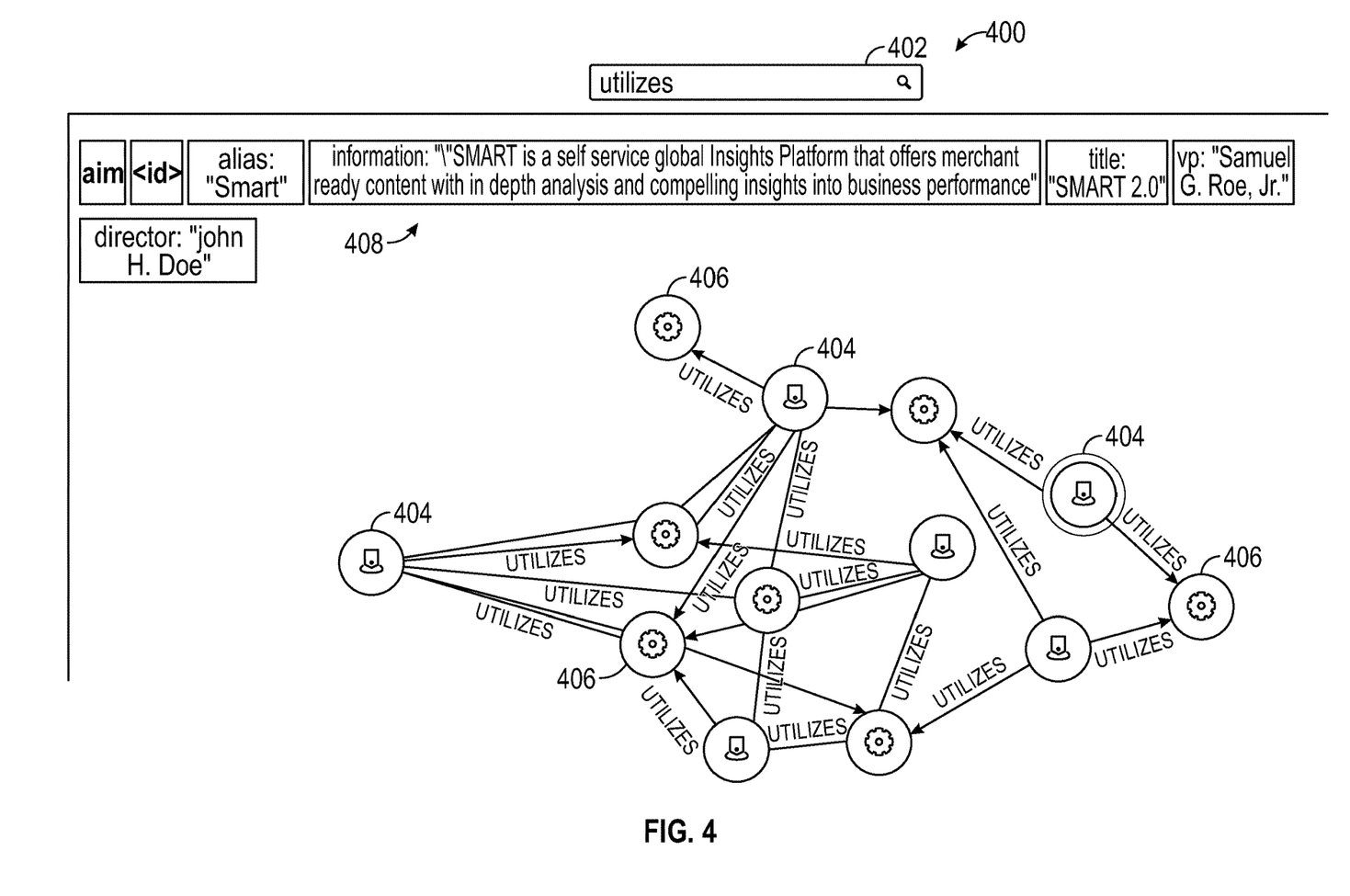
FIG. 4 illustrates a graphical relationship map associated with a third search request, in accordance with various embodiments.

In various embodiments, and with additional reference to FIG. 4, a graphical relationship map 400 is illustrated. Graphical relationship map 400 (i.e., map 400) is associated with a third search request 402. The third search request 402 may include a relationship such as, for example, a "uses" link. The map 400 may include a plurality of entity icons, such as platform entity icons 404 and technology entity icons 406 related by the "uses" link. In this regard, the map 400 may enable visualization of a cluster of technology entities related to platform entities. In various embodiments, any of the entity type icons may be selected and, in response, the map 400 may display the related information set 408.

Figure 5:
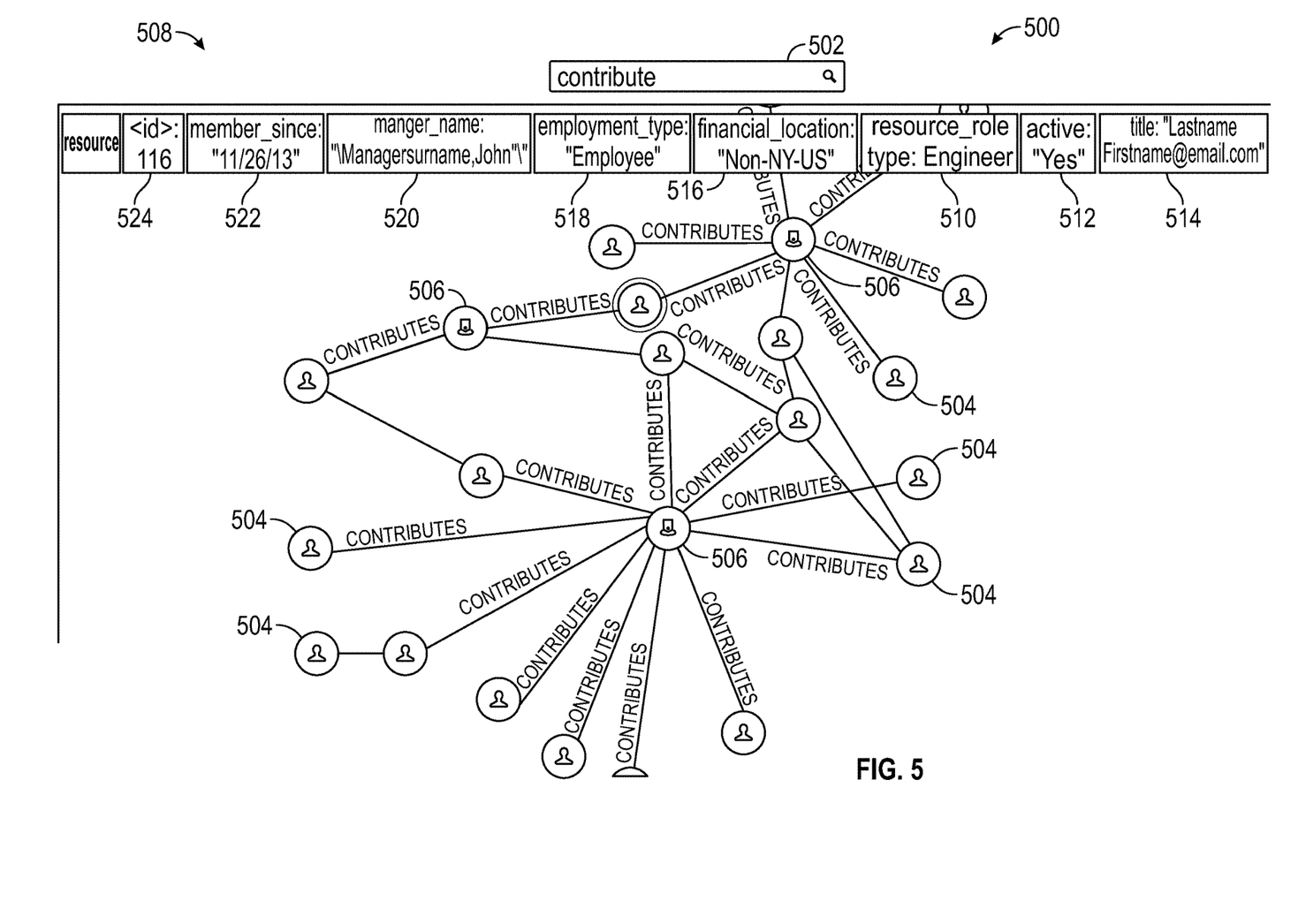
FIG. 5 illustrates a graphical relationship map associated with a fourth search request, in accordance with various embodiments.

In various embodiments, and with additional reference to FIG. 5, a graphical relationship map 500 is illustrated. Graphical relationship map 500 (i.e., map 500) is associated with a fourth search request 502. The fourth search request 502 may include a relationship such as a "contributes" link and a platform entity. The map 500 includes a plurality of user entity icons 504 linked by the specified relationship with the platform entity icon 506. In this regard, the map 500 may enable visualization of a cluster of user entities associated with a platform entity. In various embodiments, any of the entity type icons may be selected and, in response, the map 500 may display the related information set 508. For example, a user entity icon 504 may be selected and the map 500 may display a resource role type 510, an active state 512, an email address 514, a location 516, an employment type 518, a manager name 520, a membership date 522, and an entity ID 524.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment.

Although specific advantages have been enumerated herein, various embodiments may include some, none, or all of the enumerated advantages.

Systems, methods, and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy," "meet," "match," "associated with", or similar phrases may include an identical match, a partial match, meeting certain criteria, matching a subset of data, a correlation, satisfying certain criteria, a correspondence, an association, an algorithmic relationship, and/or the like. Similarly, as used herein, "authenticate" or similar terms may include an exact authentication, a partial authentication, authenticating a subset of data, a correspondence, satisfying certain criteria, an association, an algorithmic relationship, and/or the like, Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input, and/or any other method known in the art.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for". As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

In various embodiments, software may be stored in a computer program product and loaded into a computer system using removable storage drive, hard disk drive, or communications interface. The control logic (software), when executed by the processor, causes the processor to perform the functions of various embodiments as described herein. In various embodiments, hardware components may take the form of application specific integrated circuits (ASICs). Implementation of the hardware state machine so as to perform the functions described herein will be apparent to persons skilled in the relevant art(s).

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, CD-ROM, BLU-RAY DISC®, optical storage devices, magnetic storage devices, and/or the like.

The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript, or the like.

The system and method are described herein with reference to screen shots, block diagrams and flowchart illustrations of methods, apparatus, and computer program products according to various embodiments. It will be understood that each functional block of the block diagrams and the flowchart illustrations, and combinations of functional blocks in the block diagrams and flowchart illustrations, respectively, can be implemented by computer program instructions.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS® applications, webpages, websites, web forms, prompts, etc. Practitioners will appreciate that the illustrated steps described herein may comprise in any number of configurations including the use of WINDOWS® applications, webpages, web forms, popup WINDOWS® applications, prompts, and the like. It should be further appreciated that the multiple steps as illustrated and described may be combined into single webpages and/or WINDOWS® applications but have been expanded for the sake of simplicity. In other cases, steps illustrated and described as single process steps may be separated into multiple webpages and/or WINDOWS® applications but have been combined for simplicity.

In various embodiments, the software elements of the system may also be implemented using a JAVASCRIPT® run-time environment configured to execute JAVASCRIPT® code outside of a web browser. For example, the software elements of the system may also be implemented using NODE.JS® components. NODE.JS® programs may implement several modules to handle various core functionalities. For example, a package management module, such as NPM®, may be implemented as an open source library to aid in organizing the installation and management of third-party NODE.JS® programs. NODE.JS® programs may also implement a process manager, such as, for example, Parallel Multithreaded Machine ("PM2"); a resource and performance monitoring tool, such as, for example, Node Application Metrics ("appmetrics"); a library module for building user interfaces, and/or any other suitable and/or desired module.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the internet server. Middleware may be configured to process transactions between the various components of an application server and any number of internal or external systems for any of the purposes disclosed herein. WEBSPHERE® MQTM (formerly MQSeries) by IBM®, Inc. (Armonk, New York) is an example of a commercially available middleware product. An Enterprise Service Bus ("ESB") application is another example of middleware.

The computers discussed herein may provide a suitable website or other internet-based graphical user interface which is accessible by users. In one embodiment, MICROSOFT® company's Internet Information Services (IIS), Transaction Server (MTS) service, and an SQL SERVER® database, are used in conjunction with MICROSOFT® operating systems, WINDOWS NT' web server software, SQL SERVER® database, and MICROSOFT® Commerce Server. Additionally, components such as ACCESS® software, SQL SERVER® database, ORACLE® software, SYBASE® software, INFORMIX® software, MYSQL® software, INTERBASE® software, etc., may be used to provide an Active Data Object (ADO) compliant database management system. In one embodiment, the APACHE® web server is used in conjunction with a LINUX® operating system, a MYSQL® database, and PERL®, PHP, Ruby, and/or PYTHON® programming languages.

For the sake of brevity, conventional data networking, application development, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, UNIX®, LINUX®, SOLARIS®, MACOS®, etc.) as well as various conventional support software and drivers typically associated with computers.

The present system or any part(s) or function(s) thereof may be implemented using hardware, software, or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by artificial intelligence (AI) or machine learning. Artificial intelligence may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

In various embodiments, the embodiments are directed toward one or more computer systems capable of carrying out the functionalities described herein. The computer system includes one or more processors. The processor is connected to a communication infrastructure (e.g., a communications bus, cross-over bar, network, etc.). Various software embodiments are described in terms of this exemplary computer system. After reading this description, it will become apparent to a person skilled in the relevant art(s) how to implement various embodiments using other computer systems and/or architectures. The computer system can include a display interface that forwards graphics, text, and other data from the communication infrastructure (or from a frame buffer not shown) for display on a display unit.

The computer system also includes a main memory, such as random access memory (RAM), and may also include a secondary memory. The secondary memory may include, for example, a hard disk drive, a solid-state drive, and/or a removable storage drive. The removable storage drive reads from and/or writes to a removable storage unit in a well-known manner. As will be appreciated, the removable storage unit includes a computer usable storage medium having stored therein computer software and/or data.

In various embodiments, secondary memory may include other similar devices for allowing computer programs or other instructions to be loaded into a computer system. Such devices may include, for example, a removable storage unit and an interface. Examples of such may include a program cartridge and cartridge interface (such as that found in video game devices), a removable memory chip (such as an erasable programmable read only memory (EPROM), programmable read only memory (PROM)) and associated socket, or other removable storage units and interfaces, which allow software and data to be transferred from the removable storage unit to a computer system.

The computer system may also include a communications interface. A communications interface allows software and data to be transferred between the computer system and external devices. Examples of communications interface may include a modem, a network interface (such as an Ethernet card), a communications port, etc. Software and data transferred via the communications interface are in the form of signals which may be electronic, electromagnetic, optical, or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

In various embodiments, the server may include application servers (e.g., WEBSPHERE®, WEBLOGIC®, JBOSS®, POSTGRES PLUS ADVANCED SERVER®, etc.). In various embodiments, the server may include web servers (e.g., Apache, IIS, GOOGLE® Web Server, SUN JAVA® System Web Server, JAVA® Virtual Machine running on LINUX® or WINDOWS® operating systems).

A web client includes any device or software which communicates via any network, such as, for example any device or software discussed herein. The web client may include internet browsing software installed within a computing unit or system to conduct online transactions and/or communications. These computing units or systems may take the form of a computer or set of computers, although other types of computing units or systems may be used, including personal computers, laptops, notebooks, tablets, smart phones, cellular phones, personal digital assistants, servers, pooled servers, mainframe computers, distributed computing clusters, kiosks, terminals, point of sale (POS) devices or terminals, televisions, or any other device capable of receiving data over a network. The web client may include an operating system (e.g., WINDOWS®, WIN- DOWS MOBILE® operating systems, UNIX® operating system, LINUX® operating systems, APPLE® OS® operating systems, etc.) as well as various conventional support software and drivers typically associated with computers. The web-client may also run MICROSOFT® INTERNET EXPLORER® software, MOZILLA® FIREFOX® software, GOOGLE® CHROME® software, APPLE® SAFARI' software, or any other of the myriad software packages available for browsing the internet.

As those skilled in the art will appreciate, the web client may or may not be in direct contact with the server (e.g., application server, web server, etc., as discussed herein). For example, the web client may access the services of the server through another server and/or hardware component, which may have a direct or indirect connection to an internet server. For example, the web client may communicate with the server via a load balancer. In various embodiments, web client access is through a network or the internet through a commercially-available web-browser software package. In that regard, the web client may be in a home or business environment with access to the network or the internet. The web client may implement security protocols such as Secure Sockets Layer (SSL) and Transport Layer Security (TLS). A web client may implement several application layer protocols including HTTP, HTTPS, FTP, and SFTP.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT® programs, active server pages (ASP), common gateway interface scripts (CGI), extensible markup language (XML), dynamic HTML, cascading style sheets (CSS), AJAX (Asynchronous JAVASCRIPT And XML) programs, helper applications, plug-ins, and the like. A server may include a web service that receives a request from a web server, the request including a URL and an IP address (192.168.1.1). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. For example, representational state transfer (REST), or RESTful, web services may provide one way of enabling interoperability between applications.

The computing unit of the web client may be further equipped with an internet browser connected to the internet or an intranet using standard dial-up, cable, DSL, or any other internet protocol known in the art. Transactions originating at a web client may pass through a firewall in order to prevent unauthorized access from users of other networks. Further, additional firewalls may be deployed between the varying components of CMS to further enhance security.

Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, Triple DES, Blowfish, AES, MD5, HMAC, IDEA, RC6, and symmetric and asymmetric cryptosystems. The systems and methods may also incorporate SHA series cryptographic methods, elliptic curve cryptography (e.g., ECC, ECDH, ECDSA, etc.), and/or other post-quantum cryptography algorithms under development.

Any databases discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, New York), various database products available from ORACLE® Corporation (Redwood Shores, California), MICROSOFT ACCESS® or MICROSOFT SQL SERVER® by MICROSOFT® Corporation (Redmond, Washington), MYSQL® by MySQL AB (Uppsala, Sweden), MONGODB®, Redis, APACHE CASSANDRA®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); data stored as Binary Large Object (BLOB); data stored as ungrouped data elements encoded using ISO/IEC 7816-6 data elements; data stored as ungrouped data elements encoded using ISO/IEC Abstract Syntax Notation (ASN.1) as in ISO/IEC 8824 and 8825;

other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by a third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user, or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer, may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the stand-alone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers, or other components of the system may consist of any combination thereof at a single location or at multiple locations, wherein each database or system includes any of various suitable security features, such as firewalls, access codes, encryption, decryption, compression, decompression, and/or the like.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

Distributed computing cluster may be, for example, a HADOOP® software cluster configured to process and store big data sets with some of nodes comprising a distributed storage system and some of nodes comprising a distributed processing system. In that regard, distributed computing cluster may be configured to support a HADOOP® software distributed file system (HDFS) as specified by the Apache Software Foundation at www.hadoop.apache.org/docs.

As used herein, the term "network" includes any cloud, cloud computing system, or electronic communications system or method which incorporates hardware and/or software components. Communication among the parties may be accomplished through any suitable communication channels, such as, for example, a telephone network, an extranet, an intranet, internet, point of interaction device (point of sale device, personal digital assistant (e.g., an IPHONE® device, a BLACKBERRY® device), cellular phone, kiosk, etc.), online communications, satellite communications, off-line communications, wireless communications, transponder communications, local area network (LAN), wide area network (WAN), virtual private network (VPN), networked or linked devices, keyboard, mouse, and/or any suitable communication or data input modality. Moreover, although the system is frequently described herein as being implemented with TCP/IP communications protocols, the system may also be implemented using IPX, APPLETALK® program, IP-6, NetBIOS, OSI, any tunneling protocol (e.g. IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the internet is generally known to those skilled in the art and, as such, need not be detailed herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand.

As used herein, "transmit" may include sending electronic data from one system component to another over a network connection. Additionally, as used herein, "data" may include encompassing information such as commands, queries, files, data for storage, and the like in digital or any other form.

The disclosure and claims do not describe only a particular outcome of automated classifying of electronic messages, but the disclosure and claims include specific rules for implementing the outcome of automated classifying of electronic messages and that render information into a specific format that is then used and applied to create the desired results of automated classifying of electronic messages and support case generation, as set forth in *McRO, Inc.* v. *Bandai Namco Games America Inc.* (Fed. Cir. case number 15-1080, Sep. 13, 2016). In other words, the outcome of automated classifying of electronic messages can be performed by many different types of rules and combinations of rules, and this disclosure includes various embodiments with specific rules. While the absence of complete preemption may not guarantee that a claim is eligible, the disclosure does not sufficiently preempt the field of automated classifying of electronic messages at all. The disclosure acts to narrow, confine, and otherwise tie down the disclosure so as not to cover the general abstract idea of just automated classifying of electronic messages. Significantly, other systems and methods exist for automated classifying of electronic messages, so it would be inappropriate to assert that the claimed invention preempts the field or monopolizes the basic tools of automated classifying of electronic messages. In other words, the disclosure will not prevent others from automated classifying of electronic messages, because other systems are already performing the functionality in different ways than the claimed invention. Moreover, the claimed invention includes an inventive concept that may be found in the non-conventional and non-generic arrangement of known, conventional pieces, in conformance with *Bascom* v. *AT&T Mobility,* 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

What is claimed is:

1. A method, comprising:
   receiving, by a computer based system, a search request;
   extracting, by the computer based system, a plurality of structured data sets and a plurality of unstructured data sets;
   executing a natural language processing (NLP) algorithm on the plurality of unstructured data sets to identify a topic of each of the plurality of unstructured data sets;
   matching at least two unstructured data sets from among the plurality of unstructured data sets together based on a similarity between identified topics of the at least two unstructured data sets identified by the NLP algorithm to generate a linked data set;
   mapping the linked data set to a structured data set among the plurality of structured data sets;
   generating, by the computer based system, a relationship map that includes a display of the linked data set mapped to the structured data set, wherein the relationship map data is based at least in part on linked data elements of the linked data set, wherein the relationship map data includes a plurality of entity type icons, wherein each of the plurality of entity type icons is associated on a one to one basis with an entity type defined by a particular data set of the linked data set;
   displaying, by the computer based system, the relationship map via a graphical user interface (GUI); and
   upon receiving a selection of an entity type icon, of the plurality of entity type icons, via the relationship map displayed on the GUI, displaying, by the computer based system, data elements from the relationship map which are associated with the selection.

2. The method of claim 1, wherein the method further comprises:
   linking, by the computer based system, a first structured data set defining a first entity type with a second structured data set defining a third entity type to generate a structured link set, wherein the structured link set is based on a common key; and
   joining, by the computer based system, the structured link set to the relationship map.

3. The method of claim 2, further comprising:
   linking, by the computer based system, the first structured data set defining the first entity type with a first unstructured data set defining a second entity type to generate a hybrid link set, wherein the hybrid link set is based on an inference between the first structured data set and the first unstructured data set; and
   joining, by the computer based system, the hybrid link set to the relationship map.

4. The method of claim 3, wherein the at least one link set further comprises an unstructured link set, the method further comprising:
   linking by the computer based system, a second unstructured data set defining a fourth entity type with the first unstructured data set defining the second entity type to generate an unstructured link set, wherein the unstructured link set is based on a user entity relationship;
   joining, by the computer based system, the unstructured link set to the relationship map; and
   storing, by the computer based system, the link set as a BLOB data set.

5. The method of claim 4, further comprising,
   applying, by the computer based system, the NLP algorithm to at least one of the first unstructured data set or the second unstructured data set to generate the unstructured link set.

6. The method of claim 4, wherein the GUI includes a plurality of entity type icons each associated on a one to one basis with the first entity type, the second entity type, the third entity type, and the fourth entity type, and
   wherein the graphical relationship map includes a plurality of links between the plurality of entity type icons based on at least one of the structured link set, the hybrid link set, or the unstructured link set.

7. The method of claim 5, further comprising:
   generating, by the computer based system, a topic set from the first unstructured data set and the second unstructured data set; and
   generating, by the computer based-system, the unstructured link set based on the topic set.

8. A system comprising:
a processor that, when executing instructions stored in a memory, is configured to
receive a search request;
extract a plurality of structured data sets and a plurality of unstructured data sets;
execute a natural language processing (NLP) algorithm on the plurality of unstructured data sets to identify a topic of each of the plurality of unstructured data sets, respectively;
match at least two unstructured data sets from among the plurality of unstructured data sets together based on a similarity between identified topics of the at least two unstructured data sets identified by the NLP algorithm to generate a linked data set;
map the linked data set to a structured data set among the plurality of structured data sets;
generate a relationship map that includes a display of the linked data set mapped to the structured data, wherein the relationship map data is based at least in part on linked data elements of the linked data set,
wherein the relationship map data includes a plurality of entity type icons, wherein each of the plurality of entity type icons is associated on a one to one basis with an entity type defined by a particular data set of the linked data set;
display the relationship map via a graphical user interface (GUI); and
upon receiving a selection of an entity type icon, of the plurality of entity type icons, via the relationship map displayed on the GUI, display data elements from the relationship map which are associated with the selection.

9. The system of claim 8, wherein the processor is further configured to:
link a first structured data set defining a first entity type with a second structured data set defining a third entity type to generate a structured link set, wherein the structured link set is based on a common key; and
join the structured link set to the relationship map.

10. The system of claim 9, further comprising:
link the first structured data set defining the first entity type with a first unstructured data set defining the second entity type to generate a hybrid link set, wherein the hybrid link set is based on an inference between the first structured data set and the first unstructured data set; and
join the hybrid link set to the relationship map.

11. The system of claim 10, wherein the at least one link set further comprises an unstructured link set, and wherein the processor is further configured to:
link a second unstructured data set defining a fourth entity type with the first unstructured data set defining the second entity type to generate an unstructured link set, wherein the unstructured link set is based on a user entity relationship;
join the unstructured link set to the relationship map data; and storing, by the processor, the at least one link set as a BLOB data set.

12. The system of claim 11, wherein the processor is further configured to:
apply the NLP algorithm to at least one of the first unstructured data set or the second unstructured data set to generate the unstructured link set.

13. The system of claim 11, wherein the GUI includes a plurality of entity type icons, each associated on a one to one basis with the first entity type, the second entity type, the third entity type, and the fourth entity type, and
wherein the graphical relationship map includes a plurality of links between the plurality of entity type icons based on at least one of the structured link set, the hybrid link set, or the unstructured link set.

14. The system of claim 12, wherein the processor is further configured to:
generate a topic set from the first unstructured data set and the second unstructured data set; and
generate the unstructured link set based on the topic set.

15. A non-transitory computer-readable storage medium storing instructions that, when executed by a processor, cause the processor to perform:
receiving a search request;
extracting a plurality of structured data sets and a plurality of unstructured data sets;
executing a natural language processing (NLP) algorithm on the plurality of unstructured data sets to identify a topic of each of the plurality of unstructured data sets;
matching at least two unstructured data sets from among the plurality of unstructured data sets together based on a similarity between identified topics of the at least two unstructured data sets identified by the NLP algorithm to generate a linked data set;
mapping the linked data set to a structured data set among the plurality of structured data sets;
generating a relationship map that includes a display of the linked data set mapped to the structured data set, wherein the relationship map data is based at least in part on linked data elements of the linked data set, wherein the relationship map data includes a plurality of entity type icons, wherein each of the plurality of entity type icons is associated on a one to one basis with an entity type defined by a particular data set of the linked data set;
displaying the relationship map via a graphical user interface (GUI); and
upon receiving a selection of an entity type icon, of the plurality of entity type icons, via the relationship map displayed on the GUI, displaying data elements from the relationship map which are associated with the selection.

16. The non-transitory computer-readable storage medium of claim 15, wherein the instructions further cause the processor to perform:
linking a first structured data set defining a first entity type with a second structured data set defining a third entity type to generate a structured link set, wherein the structured link set is based on a common key; and
joining the structured link set to the relationship map.

17. The non-transitory computer-readable storage medium of claim 16, wherein the instructions further cause the processor to perform:
linking the first structured data set defining the first entity type with a first unstructured data set defining the second entity type to generate a hybrid link set, wherein the hybrid link set is based on an inference between the first structured data set and the first unstructured data set; and
joining the hybrid link set to the relationship map.

18. The non-transitory computer-readable storage medium of claim 17, wherein the at least one link set further comprises:
an unstructured link set, and
wherein the instructions further cause the processor to perform:

linking a second unstructured data set defining a fourth entity type with the first unstructured data set defining the second entity type to generate the unstructured link set, wherein the unstructured link set is based on a user entity relationship;

joining the unstructured link set to the relationship map; and storing the link set as a BLOB data set.

19. The non-transitory computer-readable storage medium of claim 18, wherein the instructions further cause the processor to perform:

applying a natural language processing algorithm to the first unstructured data set and the second unstructured data set to generate a corresponding topic set, wherein the corresponding topic set comprises matched topics between the first unstructured data set and the second unstructured data set; and generating the unstructured link set based on the corresponding topic set.

20. The non-transitory computer-readable storage medium of claim 18, wherein the GUI includes a plurality of icons, each associated on a one to one basis with the first entity type, the second entity type, the third entity type, and the fourth entity type, and wherein the graphical relationship map includes a plurality of links between the plurality of entity type icons based on at least one of the structured link set, the hybrid link set, or the unstructured link set.

* * * * *